United States Patent [19]

Hughes

[11] 4,191,862
[45] Mar. 4, 1980

[54] DUAL FREQUENCY TONE DECODER

[75] Inventor: Raymond J. Hughes, San Jose, Calif.

[73] Assignee: Rolm Corporation, Santa Clara, Calif.

[21] Appl. No.: 931,595

[22] Filed: Aug. 7, 1978

[51] Int. Cl.² .............................................. H04M 1/50
[52] U.S. Cl. ................................................ 179/84 VF
[58] Field of Search ......................... 179/84 VF, 84 R; 328/138, 153; 340/171 R, 171 A; 324/77 E

[56] References Cited

U.S. PATENT DOCUMENTS 3,875,347  4/1975  Alaily ............................... 179/84 VF Primary Examiner—Bernard Konick
Assistant Examiner—Joseph A. Popek
Attorney, Agent, or Firm—Townsend and Townsend

[57] ABSTRACT

An interface between a telephone switch bus line and a dual tone multiple frequency (DTMF) type digital tone decoder is provided which minimizes false tone decoding due to filter-induced transient oscillations caused by spurious impulse noise and the like on the input bus line. The interface includes a limiter circuit for generating a uniform amplitude output pulse train and a circuit for automatically generating a variable threshold which is time responsive to input signals on the input bus line. The variable threshold circuit output signals are used by the limiter circuit to mask transient oscillations in the tone filter output. Only when persistence of the oscillations wherein the limiter threshold level signal is finally less than the peak amplitude of the input signals to the limiter from the tone filter will such input signals be sensed as valid switching tone signals.

6 Claims, 5 Drawing Figures

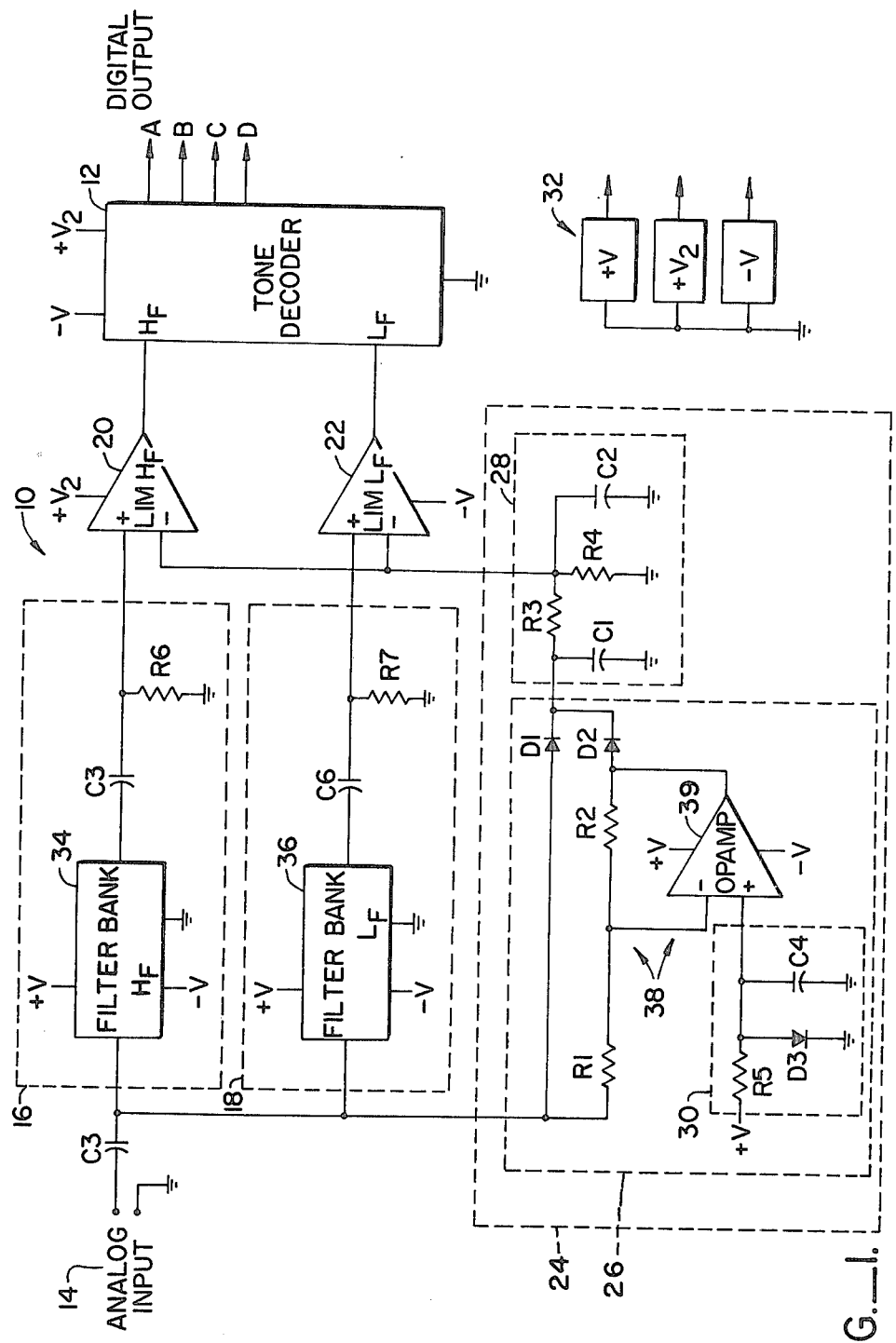
FIG._1.

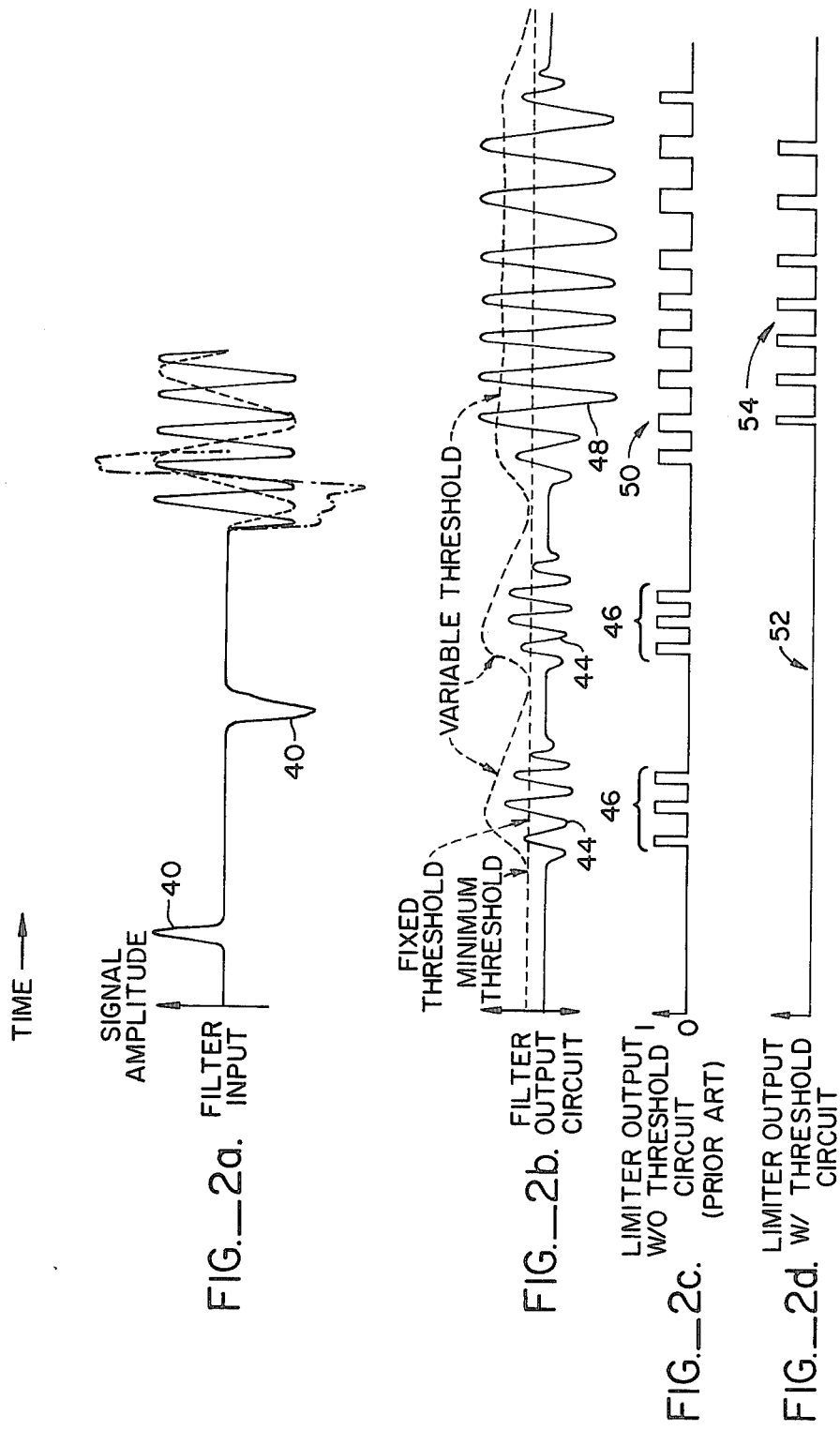

DUAL FREQUENCY TONE DECODER

BACKGROUND OF THE INVENTION

1. Field of Invention

This invention relates to tone-switched telephone systems and particularly to an interface for a telephone switch bus line and a dual tone multiple frequency (DTMF) type tone decoder which inhibits recognition of spurious signals as valid switching tones.

Dual tone multiple frequency (DTMF) signaling has been developed for switching communication channels in telephone communication systems. According to the DTMF technique, a pair of non-harmonically-related tones are transmitted via a signal bus line to a detector which detects the tone pairs and identifies the number associated therewith. The tone pair is made up of one tone from a low frequency group (697, 770, 852, 941 Hz) and one tone from a high frequency group (1209, 1336, 1477, 1633 Hz).

For proper operation, any DTMF detector must recognize a tone pair within a defined bandwidth while tolerating spurious noise, input amplitude variation, and amplitude differential between tones. Further, the detector must operate within timing restrictions imposed by the DTMF generation and detection process as well as meet any other particular requirements of a specific application, such as to distinguish a modulated voice signal from an encoding tone.

DTMF detectors and interface circuitry typically comprise three stages, namely, band splitting filters, an automatic gain control (AGC) and limiter circuit, and a tone decoder. The band splitting filters receive DTMF tone pairs from a telephone bus line and separate the tone pairs into the respective high frequency and low frequency groups and also reject frequency information out of the defined bandwidths which could cause false digits to be decoded. The AGC/limiter stage converts the analog tones into square waves, or constant amplitude pulses. The output of the AGC/limiter stage is processed by a digital tone decoder, which determines the validity of the incoming square wave pulse train as a number tone and converts valid pulse train signals to logic signals for further procession by a switchboard exchange.

Because a tone decoder is a digital device, the interface, particularly the band splitting filters, must have a rejection characteristic of at least 40 dB of signals outside of the pass band. Many filters of this nature are characterized by relatively high susceptibility to transient oscillation at the pass band frequency in response to input signals. As a consequence, any impulses on the input side, such as transients on the signal bus line including contact closure of a telephone key pad, shot noise and the like, can cause the filter circuits to ring for several milliseconds at the pass band frequency of the filters. If the AGC/limiter stage passes the ringing or transient oscillation on to the decoder, undesired errors in the digit decoding process will occur. The result will be incorrectly switched calls and like signaling errors. Accordingly, some provision must be made between the signal bus line input and the tone decoder, particularly in the limiter stage, to eliminate such undesired decoding errors.

2. Description of the Prior Art

Techniques are known to the telephone art for distinguishing extended tone signals from spurious signals. U.S. Pat. No. 3,944,753 discloses a system which includes a frequency drop detector and means for detecting output signals lasting longer than a predetermined period in order to distinguish tone signals from voices and other spurious signals. The '753 patent discloses a system in which the operating threshold of a frequency detection circuit can be varied at different rates in opposite amplitude directions.

U.S. Pat. No. 3,836,727 discloses a discriminator circuit providing a first and second threshold level for use in a DTMF signal detecting scheme. A capacitive charging circuit having a fast attack and slow decay is also disclosed. The '727 patent discloses a detecting scheme wherein both the pure tone signal and the disturbed or noisy tone signal are processed during time intervals of fixed equal length.

These known references fail to expressly teach a technique for masking out transient oscillations in narrow band bandpass filter output signals in a telephone system tone decoding interface circuit.

SUMMARY OF THE INVENTION

According to the invention, an interface between a telephone switch bus line and a dual tone multiple frequency (DTMF) type digital tone decoder is provided which minimizes false tone decoding due to filter-induced transient oscillations resulting from spurious impulse noise present on the input bus line. The interface includes a limiter circuit for generating a uniform amplitude output pulse train and a circuit for automatically generating a variable threshold which is time responsive to input signals on the input bus line. The variable threshold circuit output signal is used by the limiter circuit to mask transient oscillations in the tone filter output caused by spurious short-term input signals such as shot noise, contact noise and the like. Only when persistence of the oscillations wherein the limiter threshold level signal is finally less than the peak amplitude of the input signals to the limiter from the tone filter will such input signals be sensed as valid switching tone signals. In a specific embodiment, the input signal to the limiter circuit is the output of a narrow band bandpass filter stage typically susceptible to transient oscillation due to short-term input signals and characterized by a time delay. The transmission delay permits the automatic threshold circuitry to respond to filter input signals and to raise the threshold prior to the reception by the limiter circuit of spurious transient oscillations from the output of the filter stage and to maintain a threshold exceeding the peak of the transient oscillations for their duration.

An object of this invention is the provision of an automatic threshold to mask out transient oscillations in the bandpass filter signals of a dual tone multiple frequency type tone decoder.

A further object of the invention is the provision of a circuit which generates a constant maximum amplitude pulse signal detectable as the valid tone representation of a number in a DTMF telephone switching system.

Other objects and the advantages of the invention will be apparent from the following detailed description taken in connection with the attached drawings.

BRIEF DESCRIPTION OF THE DRAWINGS

FIG. 1 is a schematic block diagram of an interface circuit according to the invention coupled to a tone decoder.

FIGS. 2a-d are waveform diagrams for illustrating the operation of the invention, FIG. 2c being a representation of a limiter stage output signal of the prior art.

DETAILED DESCRIPTION OF PREFERRED EMBODIMENTS

Referring to FIG. 1, there is shown a schematic block diagram of a digital dual tone multiple frequency (DTMF) receiver interface 10 according to the invention coupled to a conventional DTMF tone decoder 12.

The receiver interface connects a telephone switch bus line (not shown) at an analog input 14 and comprises the following sections or circuit segments: band splitting filters comprising a high group filter 16 and a low group filter 18, limiter circuits comprising a high frequency limiter 20 and a low frequency limiter 22, and an auto threshold circuit 24. The auto threshold circuit 24 includes a rectifier 26, an integrator 28, and a bias network 30. A power supply 32 comprising a +V voltage level, a +V$_2$ voltage level and a −V voltage level is also included and coupled as indicated in FIG. 1 to the various sections.

The high group filter 16, the low group filter 18 and the input of rectifier 26 of the auto threshold circuit 24 are coupled through a capacitor C3 to the analog input 14. The output of the high group filter 16 is coupled to the noninverting input of the high frequency limiter 20, and the output of the low group filter 18 is coupled to the noninverting input of the low frequency limiter 22. The output of the integrator 28 of the auto threshold circuit is coupled to the inverting inputs of both the high frequency limiter 20 and the low frequency limiter 22. The outputs of the high frequency limiter 20 and low frequency limiter 22 are coupled to a pair of inputs of the tone decoder 12.

The exact specification of the high group filter 16, low group filter 18 and tone decoder 12 are not essential to an understanding of the invention, and the tone decoder 12 is a standard telephone type tone decoder adapted to receive a pair of amplitude limited (square wave) pulse train tones from a high frequency group (1209, 1336, 1477, 1633 Hz) and from a low frequency group (697, 770, 852, 941 Hz) and to deliver a four bit digital output signal, such as a BCD coded output. The high group filter 16 typically comprises a filter bank 34 of four parallel single pole bandpass filters centered at the frequencies of the high frequency group and having a Q of about 20 or more.

Similarly, the low group filter 18 comprises a filter bank 36 of four parallel single pole bandpass filters centered at the frequencies of the low frequency group and having a Q of about 20 or more. The high group filter 16 and the low group filter 18 both impose an inherent transmission delay on input signals. The outputs of each of the filters of the two filter banks 34 and 36 are coupled through high pass filters and impedance matching networks to the inputs of the limiters 20 and 22. Specifically, filter bank 34 is coupled through a capacitor C5 shunted to ground and by a resistor R6 to the noninverting input of high frequency limiter 20, and the output of filter bank 36 is coupled through a capacitor C6 shunted to ground by a resistor R7 to the noninverting input of low frequency limiter 22.

The auto threshold circuit 24, comprising rectifier 26, integrator 28 and bias network 30, is operative to generate a DC variable threshold signal in response to the nature and level of AC and transient input signals at the analog input 14. The rectifier 26 comprises a diode D1, a diode D2 and a biased inverting amplifier 38. Diode D1 is coupled between the analog input 14 and the rectifier output in such a manner as to be forward biased in response to positive voltage signals. Diode D2 is coupled in parallel with diode D1 and is connected at the signal input side to the amplifier 38 in such a manner as to be forward biased in response to an inverted negative input signal.

The amplifier 38 comprises an operational amplifier 39 and resistors R1 and R2 coupled to the operational amplifier such that an inverted input signal of gain one is delivered to diode D2.

Bias network 30 is coupled to the inverting amplifier 38 at the noninverting reference input of operational amplifier 39 to establish the bias level of the operational amplifier 39 and the diodes D1 and D2. The bias network comprises a resistor R5 of equal value to R1 coupled to a bias voltage +V, a by-pass capacitor C4 coupled to provide AC ground shunt, and a forward biased diode D3 coupled between the operational amplifier reference input and ground. Diodes D1, D2 and D3 are identical type diodes in order to provide temperature tracking of the threshold. Diode D3 develops the bias voltage. Since the amplifier 39 is used in an inverting mode having a gain of one, the output offset voltage is twice that of the voltage at the noninverting input of the operational amplifier 39. Thus both diodes D1 and D2 will always be forward biased with respect to a quiescent input.

The integrator 28 comprises a storage capacitor C1 coupled between the input of the integrator 28 and ground, and a resistive voltage dividing network. The dividing network comprises a resistor R3 coupled between the integrator 28 input and output and a resistor R4 coupled between the integrator 28 output and ground. In addition, a capacitor C2 is coupled across resistor R4 to provide ripple filtering at the integrator 28 output.

The auto threshold circuit 24 functions to provide a fast rise and relatively slow fall of a variable threshold voltage which is used as a reference voltage for the limiters 20 and 22. This has the effect of suppressing transient oscillations from the filter 16 and 18 from being passed through the limiters 20 and 22 as valid digital tones. By "rapid" or "fast" it is meant that the duration is shorter than the transmission delay of a transient pulse on a signal path from the bus line input to the limiter input. Specifically, it is a duration defined by a time constant not greater than the characteristic time constant on the signal path to the limiter input. In the preferred embodiment the time constant of the auto threshold circuit is less than about one half of the time constant on the signal path to the limiter input terminal. The purpose is to raise the threshold level of the limiters 20, 22 above the level of the leading edge of any signal representation of the input signal before such signal reaches the input of the limiters 20, 22.

The auto threshold circuit functions as follows: A signal at the analog input 14 is passed to the input of the auto threshold circuit 24 where it is converted to a DC voltage and applied to the input of the integrator 28. The input of the integrator 28 has a low impedance input which enables it to charge relatively rapidly. The DC voltage is also applied across the voltage divider network, resistors R3 and R4, and then to the inverting inputs of the limiters 20 and 22. The voltage divider network resistors R3 and R4 provide a high impedance discharge path for capacitor C1. Typically the time constant for the circuit comprising capacitor C1, resistors R3 and R4 is chosen to be at least about four times the average period for transient oscillation, and preferably about 16 ms. The leading edge time constant, on the other hand, is considerably shorter, being the product of the low impedance of the rectifier 26 (usually less than about 100 ohms) and the capacitor C1. A time constant of less than about two milliseconds and preferably less than about one millisecond assures a sufficiently rapid rise time relative to the transmission delay of the filters 16, 18, which is typically on the order of two milliseconds.

There are two reasons for maintaining a forward bias on diode D1 and D2. First, the forward drop of diodes D1 and D2, which is typically about 0.7 V, would be too large for lower signal levels, so a conventional full wave rectifier scheme would not respond to relatively low level input signals. Second, it is necessary to maintain a small charge on capacitor C1 in order to establish a steady state threshold level at the output of integrator 28 so that the limiter threshold voltage does not drop below the system threshold level. If it did, false signals would appear at the outputs of the limiters 20 and 22.

Referring now to FIGS. 2a through 2d, the operation of the circuit of the invention is illustrated. The signal at analog input 14 is represented by FIG. 2a. It is characterized by spurious pulses 40 and a valid frequency multiplexed dual tone signal 42. The output of one filter, namely the low group filter 18, is represented by FIG. 2b. The fixed threshold level of the prior art and the variable threshold level of the present invention are also indicated, in captioned phantom lines, in FIG. 2b. The output of a limiter without a variable threshold feature is illustrated in FIG. 2c, and the output of a limiter with a threshold circuit according to the invention is illustrated in FIG. 2d.

Referring to FIG. 2a, transient input noise 40, such as shot noise and key switch noise, induces transient oscillations 44, delayed by the characteristic of the filter, in the filter output. If the peaks of the transient oscillations 44 exceed the threshold level, i.e., the fixed threshold, then undesired digital pulses 46 will appear at the output of the limiter from transient oscillations 44 (false signals) which could be mistaken for valid tone pulses. Valid tone signals 48 will cause valid tone pulses 50 to appear.

According to the invention, however, a variable threshold level is employed whereby the comparison level is rapidly raised in response to any analog input signals of analog input 14 (FIG. 2b). The threshold level is characterized by a rapidly rising leading edge and slowly decaying trailing edge forming an envelope which "jumps over" transient oscillations 44 occurring in the filter 16, 18 output. (A typical step input signal caused by switch closure also exhibits initial amplitude jitter or transient oscillations. The variable threshold circuit therefore may respond by raising the initial threshold level higher than a steady state level to the amplitude of those input oscillations. The consequent threshold level would therefore peak and then fall to a steady state level for the duration of the closure as if "jumping over" initial transient oscillations. A similar phenomenon may occur at the trailing edge of the closure envelope. Only the case for an ideal square wave envelope is illustrated in FIGS. 2a through 2d). A valid tone signal 48, on the other hand, causes the output of the filter to persist for sufficient time to exceed the variable threshold (FIG. 2b) such that a valid tone 48 (FIG. 2b) exceeds the threshold level and causes the generation of a valid tone output signal 54 (FIG. 2d). In the preferred embodiment, the ratio of the voltage divider network resistors R3 and R4 is chosen such that, with the minimum acceptable input signal level applied, the limiter output will produce a duty cycle of 20 percent.

Both the decoder 12 and the limiters 20, 22 are commercially available components. For example, the tone decoder 12 may be a type LM567 tone decoder manufactured by National Semiconductor Company of Santa Clara, Calif. The limiter circuits may be general purpose voltage comparators such as a portion of a type LM339 or equivalent voltage comparator also manufactured by National Semiconductor Company.

The invention has now been explained with reference to specific embodiments. Modifications and further embodiments will be obvious to those of ordinary skill in the art in light of this disclosure. For example, comparator circuits of the limiters 20 and 22 might be substituted for by high speed one-shot circuits or flip-flops sensitive to low level signal transitions. It is therefore not intended that the invention be limited except as indicated by the appended claims.

I claim:

1. In combination with circuitry for comparing instantaneous amplitude of input line signals and a threshold level signal and operative in response to said input line signals exceeding said threshold level signal to generate logic level signals in the form of a repetitive pulse train at frequencies of said input line signals suitable as final output signals to a telephone system digital tone decoder, circuit means for suppressing final output signals caused by short-term transient oscillations, said circuit means comprising:

means coupled to said input line signals for sensing amplitude levels of said input line signals;

means responsive to output signals of said amplitude sensing means, and coupled to said comparing circuitry for generating a signal directing the establishment of a threshold level, wherein the generated signal is adapted to be provided to said comparing circuitry prior to availability of signals representative of said input line signals such that at least the initial transient portion of said representative signals is not propagated through said comparing circuitry; and means coupled to said comparing circuitry to delay input to said comparing circuitry of signals representative of said input line signals.

2. The combination of claim 1 wherein said threshold signal generating means further includes means for increasing said threshold level signal in response to increased amplitude of said input line signals.

3. The combination of claim 1 wherein said sensing means comprises a rectifier sensitive to relatively low level input line signals for converting said input line signals to a DC voltage, and wherein said threshold level generating means comprises a low impedance integrator means operative to integrate the leading edge of said sensed input line signals in order to raise said threshold level more rapidly than the transmission delay of said signals representative of said input line signals, and means operative to maintain at least an intermediate raised threshold level for a period determined by a time constant about at least n times the time constant of expected transient oscillations.

4. The combination of claim 3 wherein n=2.

5. In a dual tone multiple frequency telephone signal digital decoding system having input means for a telephone switch bus line signal and output means for a logic level signal input type dual tone decoding means which is responsive to a pair of logic level pulse trains and which is operative to identify a frequency dependent code represented by such pulse trains, an apparatus for coupling said input bus line to said decoding means for suppressing transient oscillations caused by spurious short-term signals, said apparatus comprising:
   a pair of narrow band bandpass filter means coupled to receive bus line dual tone signals of said input means for separating said signals into a pair of single tone signals;
   means responsive to amplitude levels of said bus line signals for establishing an increased level of a threshold signal above a steady state level prior to the output of signals of said filter means, said threshold signal level establishing means comprising a full-wave rectifier for converting a representation of said input bus line signals to DC voltage signals;
   an integrator means coupled to the output of said threshold signal level establishing means and operative to integrate said DC voltage signals in a manner to raise said threshold level signal more rapidly than the transmission delay of said filter means, said integrator means comprising a storage capacitor coupled across the output of said rectifier such that a short time constant low impedance charging path is provided, and a resistive voltage divider coupled across said storage capacitor to provide a longer time constant relatively higher impedance discharging path as compared to the time constant of said filter means;
   means for forward biasing said integrator means for assuring an output response for lower level signals; and
   a pair of limiter means adapted to receive the respective output tone signals of said pair of filter means and responsive to said threshold level signal, said limiter means being operative to generate a pair of logic level pulse trains at the frequencies of said single tone signals only when the amplitude of the output signals of said filter means exceeds said threshold level signal for suppressing an output of signals representative of short-term transient oscillations.

6. A method for suppressing undesired logic level output signals to a telephone digital tone decoder comprising the steps of:
   sensing the initial amplitude levels of input signals of an input bus line;
   delaying said input signals after said sensing step;
   rectifying said sensed amplitude levels to generate rectified signals;
   integrating said rectified signals to raise a threshold reference level above a steady state value; and
   comparing said raised threshold reference level against a signal representation of said delayed input signals and generating a logic level output signal representation of said delayed signal representation exceeding said raised threshold level.

* * * * *